United States Patent [19]
Hevenor et al.

[11] Patent Number: 5,335,298
[45] Date of Patent: Aug. 2, 1994

[54] AUTOMATED EXTRACTION OF AIRPORT RUNWAY PATTERNS FROM RADAR IMAGERY

[75] Inventors: Richard A. Hevenor; Pi-Fuay Chen, both of Alexandria, Va.

[73] Assignee: The United States of America as represented by the Secretary of the Army, Washington, D.C.

[21] Appl. No.: 746,822

[22] Filed: Aug. 19, 1991

[51] Int. Cl.$^5$ .............................................. G06K 9/46
[52] U.S. Cl. .......................................... 382/54; 382/19; 382/22; 382/9
[58] Field of Search ................... 382/56, 22, 9, 55, 54, 382/19

[56] References Cited

U.S. PATENT DOCUMENTS

| | | | |
|---|---|---|---|
| 3,987,412 | 10/1976 | Morrin, II | 382/56 |
| 4,783,829 | 9/1988 | Miyakawa et al. | 382/22 |
| 5,040,225 | 8/1991 | Gouse | 382/28 |
| 5,142,592 | 8/1992 | Moler | 382/22 |

OTHER PUBLICATIONS

Richard Hevenor & Pi-Fuay Chen, "Automated Extraction of Airport Runway Patterns from RADAR Imagery" U.S. Army Engineer Topographic Laboratories ETL0567, Jun. 1990, pp. 1-36.

*Primary Examiner*—Leo H. Boudreau
*Assistant Examiner*—Larry J. Prikockis
*Attorney, Agent, or Firm*—Luther A. Marsh

[57] ABSTRACT

Image processing for extracting terrain features from an image formed of an array of pixels is disclosed. In a particular embodiment, each pixel in a neighborhood is averaged in a direction which is most homogeneous thereby preserving and smoothing edges of the image. Edge detection in orthogonal directions is applied for defining the magnitude and direction of edges at each pixel. After edges are defined each pixel is compared with pixels in a neighborhood for determining the probability that the pixel is on an edge and the angle at which such edge is disposed. Probable edges are reinforced and non-probable or non-edges are eliminated. Reinforced edges are thinned to a minimum of one pixel without eliminating its connectivity with any adjacent pixel on the edge. Components consisting of pixels of a similar kind which are connected are identified and uniquely labeled. At least two properties of each connected component are calculated including area and spread. Connected components which fall within predefined limits indicative of a desired feature are selected. Borders of each component are identified and selected pixels are eliminated. Pixels in each border are encoded and thereafter converted into a series of straight line segments by polygon approximation. The image may be displayed or stored in a data base for later utilization.

28 Claims, 5 Drawing Sheets

AUTOMATED EXTRACTION OF AIRPORT RUNWAY PATTERNS FROM RADAR IMAGERY

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

The problem of extracting airport runway patterns from optical photography has been the subject of study for several years. Nevatia et al. "Linear Extraction and Description", Computer Graphics and Image Processing, Vol. 13, pp. 257-269, 1980 and Zhou et al. "Edge Detection and Linear Feature Extraction Using A 2-D Random Field Model", IEEE Transactions on Pattern Analysis and Machine Intelligence, Vol. II, No. 1, pp. 84-95, January 1989, are examples of current research in this area. In these works the emphasis is on low level vision computations and little effort is made to isolate the connected components of the airfield. Also, very little work has been done in extracting airport runway patterns from synthetic aperture radar imagery.

Airports represent potential military and law enforcement targets and should be extracted from radar imagery as quickly as possible. This is often difficult because the image data may often be incomplete, cluttered and noisy. Persons trained in pattern recognition are able to extract useable data. However, the work is tedious and time consuming and the results are subject to interpretation. Further, persons engaging in clandestine activities often attempt to camouflage the airfield which makes data extraction even more difficult. This is especially true in attempting to locate small air strips. Automated techniques for extracting specific data from an image involve complex pattern recognition algorithms. However, no known automated procedure is fully adequate to satisfactorily extract airport runway patterns from a radar image.

SUMMARY OF THE INVENTION

It is therefore intended herein to present a systematic procedure comprising a number of image processing steps which allow automated extraction of airport runway data from an original radar image containing an airfield. The result is a binary image consisting only of components which are related to the airfield. All connected components in the image which relate to other terrain features are eliminated.

The invention is generally directed to a method for extracting terrain features from an image formed by an array of pixels comprising a series of image processing steps. In a particular embodiment, the invention is directed to a method for extracting airport runway features from a radar image formed of an array of pixels. The method includes smoothing the image by averaging a neighborhood of each pixel in a direction which is most homogeneous thereby preserving and smoothing edges of the image and applying an edge detection operator in orthogonal directions for defining the magnitude and direction of edges at each pixel. After edges are defined each pixel is compared with pixels in a neighborhood for determining the probability that the pixel is on an edge and determining the angle at which such edge is so disposed. Probable edges are reinforced and low probability or non-edges are eliminated. Reinforced edges are thinned to a minimum of one pixel without eliminating its connectivity with any adjacent pixel on the edge. Components consisting of pixels of a similar kind which are connected are thereafter identified and uniquely labeled. At least two properties of each connected component are calculated including area and region spread. Connected components which fall within predefined limits indicative of a desired feature are selected. Borders of each component are identified and labeled. A Freeman chain code of each border is generated. Each chain is thereafter converted into a series of straight line segments by polygon approximation and the image is thereafter displayed or stored.

DESCRIPTION OF THE PREFERRED EMBODIMENT

Figure 1:
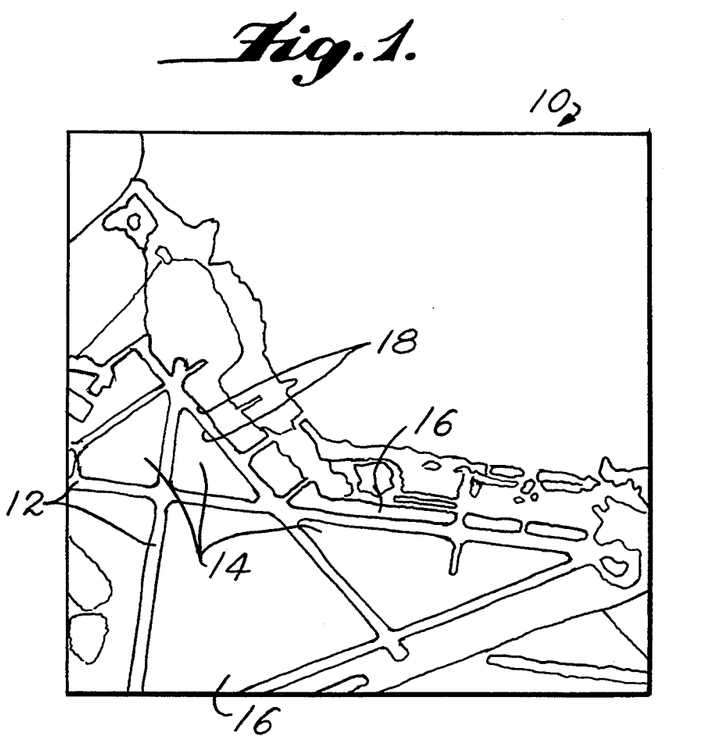
FIG. 1 is a schematic line drawing of an airport and its environs for use in the process of the invention.
Figure 2:
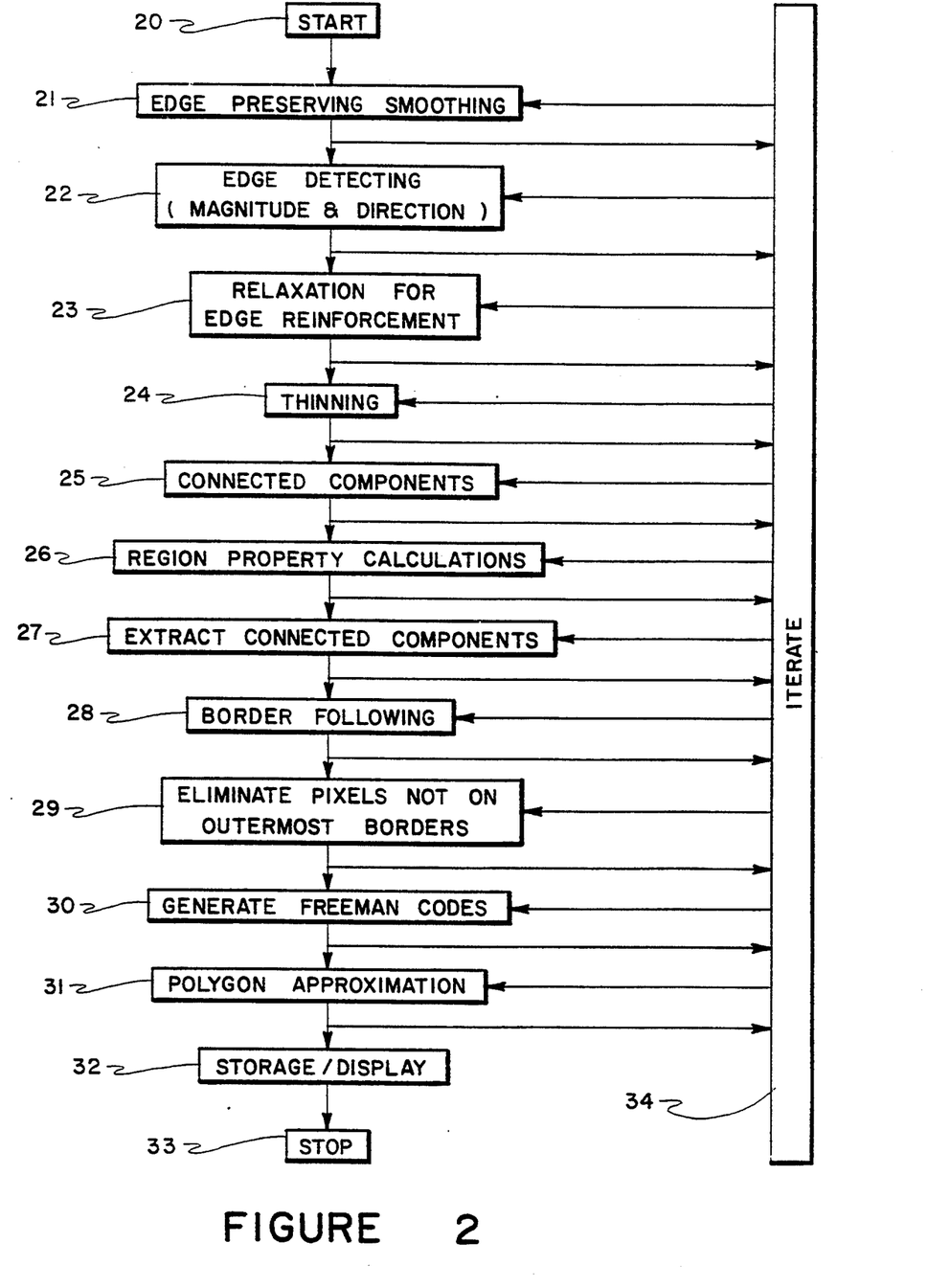
FIG. 2 is a flow chart of the process according to the invention.

In a particular embodiment, the invention relates to a procedure for extracting an airfield from a radar image. FIG. 1 is a schematic line drawing of an exemplary airport 10. In practice, a radar image of the airport 10 may be used to supply raw data for the procedure herein described. The airport 10 has runways 12, infield areas 14 and outfield areas 16. Boundaries 18 are formed at the interface between areas. Some of the figures, referred to hereinafter are modified images of FIG. 1 exemplifying results obtained at intermediate stages of the procedure. FIG. 2 illustrates the process of the invention in a generalized flow chart form.

The procedure of the invention preferably consists of the following steps:

START (20)
EDGE PRESERVING SMOOTHING (21)
EDGE DETECTING (MAGNITUDE AND DIRECTION) (22)

RELAXATION FOR EDGE REINFORCEMENT (23)
THINNING (24)
CONNECTED COMPONENTS (25)
REGION PROPERTY CALCULATIONS (26)
EXTRACT CONNECTED COMPONENTS (27)
BORDER FOLLOWING (28)
ELIMINATE PIXELS NOT ON THE OUTERMOST BORDERS (29)
GENERATE FREEMAN CHAIN CODES (30)
POLYGON APPROXIMATION (31)
STORE/DISPLAY (32)
STOP (33)

It can be seen that this procedure consists of the application of eleven substantive processing steps or algorithms other than the Start (20), Store/Display (32) and Stop (33) routines which begin with Edge Preserving Smoothing 21 and end with Polygon Approximation 31. Some of the processing routines are relatively simple such as Edge Detecting 22, however some of them are complex such as Relaxation for Edge Reinforcement 23 and Border Following 28 which are described below.

The purpose Edge Preserving Smoothing 21 is to eliminate noise, and at the same time, preserve edges so that they are not blurred. The Edge Detecting 22 algorithm enhances edges and computes the direction of the edge at each pixel. The direction of each edge is needed as an input to the next algorithm which is Relaxation for Edge Reinforcement 23. The purpose of this routine is to enhance edges using the contextual information of the surrounding neighborhood. The result of the relaxation calculations is a binary edge image in which many of the strong edges are thickened. Thinning 24 is then performed in order to thin most edges down to the thickness of one pixel width. Connected Components 25 provides a unique label (number) for each pixel in a given component of 1-pixels. Use is made of the definition of 8-connectivity for 1-pixels and 4-connectivity for 0-pixels. These definitions were also used for the thinning operation. A number of Region Property Calculations 26 may be performed. Selected properties may be applied to the data in Extract Connected Components 27 for the purpose of isolating the connected components which belong only to the airfield. Other terrain features may be isolated using different regional property calculations. Border Following 28 and Eliminate Pixels Not On Outermost Borders 29 are then used to determine and uniquely label all of the 1-pixels which exist between a given connected component of 1-pixels and a connected component of 0-pixels. The border following algorithms are implemented in this invention as follows. The first algorithm, Border Following 28, finds and labels all border pixels for both outer borders and hole borders. The second algorithm, Eliminate Pixels Not on Outermost Borders 29, finds just the outermost borders. Generate Freeman Codes 30 produces lists, each of which consists of an 8-direction Freeman chain code together with the coordinates of the initial point in the chain. The Freeman chain codes are then used as input data to Polygon Approximation 31, the purpose of which is to approximate irregular curves with a consecutive series of line segments. The following sections discuss each of the processes or algorithms in more detail. A final section presents an example of results of applying the steps to the radar image in FIG. 1.

EDGE PRESERVING SMOOTHING

Figure 3A:
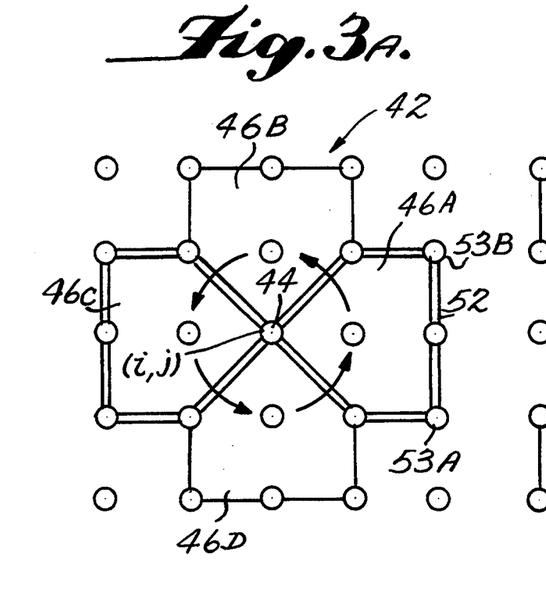
FIGS. 3A-3C illustrate a pixel under consideration, a neighborhood of pixels thereabout and a number of averaging figures.
Figure 3B:
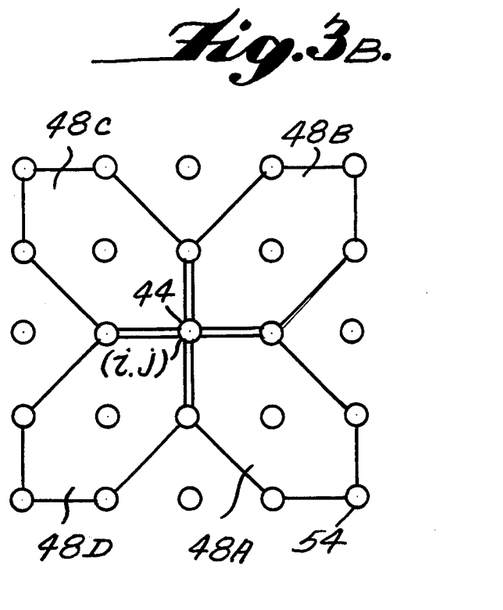
Figure 3C:
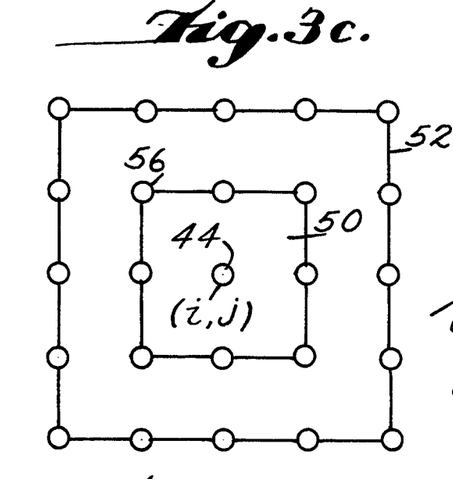

The purpose of Edge Preserving Smoothing 21 is to eliminate noise and at the same time preserve edges 18 from degradation. The variation of the gray tone in a neighborhood around each pixel is used to determine the direction which is most homogeneous. Smoothing is then performed in this direction. In order to significantly reduce noise fluctuations, the averaging neighborhood should be large. However, the computational time greatly increases with the size of the averaging neighborhood. A good compromise appears to be the use of a 5 by 5 pixel neighborhood 42 for the averaging process shown in FIGS. 3A-3C. The particular approach to Edge Preserving Smoothing 21 used in the invention consists of analyzing the gray tone variations within each 5 by 5 pixel area 42 in the image centered at pixel 44. For each 5 by 5 pixel area 42, nine geometric figures (four pentagons, four hexagons and one square) are formed using center pixel 44 as the reference. FIG. 3A illustrates four geometric FIGS. 46A-46D having the shape of a pentagon. In FIG. 3B four geometric FIGS. 48A-48D have the shape of a hexagon. In FIG. 3C one geometric figure is a square 50. Each of the four pentagons 46A-46D is formed by using the center pixel 44 as a vertex and one of the outermost edges 52 of the 5 by 5 pixel area 42 as a side which includes at least one vertex 53A or 53B of the pentagon. Each of the hexagon figures 48A-48D is formed by using the center pixel 44 as a vertex and one of the outermost corners 54 of the 5 by 5 pixel area 42 as a vertex. The 3 by 3 square 50 is formed using the center pixel 44 and its first nearest neighbors 57 lying entirely within the area 42.

The values of the pixels associated with each of the nine geometric figures are used to compute the mean and variance of the gray tones for each figure. The pentagon FIGS. 46A-46D and hexagon FIGS. 48A-48D each have 7 pixels associated with them. The square 50 has 9 pixels associated with it. The values of the pixels in a figure are averaged to produce a corresponding mean and variance for each figure. A list of nine means and nine variances is generated from all of the computations involving the nine geometric figures. The gray tone value of the center pixel 44 is replaced by the particular mean gray value which is associated with the smallest variance. The theory behind this edge preserving smoothing technique is described in Nagao et al., "A Structural Analysis of Complex Area Photographs", Plenum Press, New York, 1980. If desired, the algorithm can also be used in an iterative manner by means of iterate block 34, that is, the output of one smoothing operation can be used as the input to another.

Edge Detection (Magnitude and Direction)

Figure 4A:
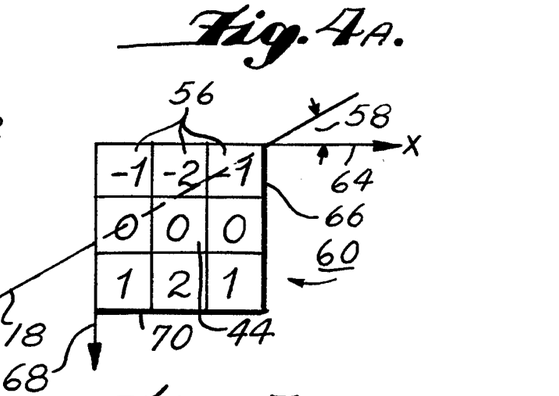
FIGS. 4A-4B are illustrations of Sobel operators applied to a 3×3 pixel array.
Figure 4B:
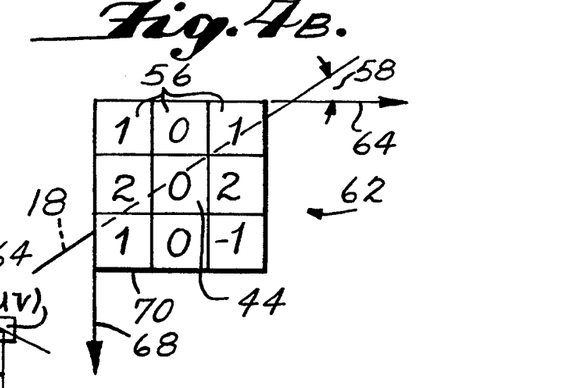

After Edge Preserving Smoothing 21 has been performed an Edge Detecting 22 operator is used to enhance edges 18 and to compute the direction of each edge 18. A preferred Edge Detecting operator used is known as a Sobel operator. This operator consists of two 3 by 3 masks 60 and 62 as shown in FIGS. 4A-4B. The Orthogonal masks 60 and 62, $S_x$ representing the x direction and $S_y$ representing the y direction, are registrably applied to each 3×3 array of pixels 56, in the image 44, to calculate a magnitude image and a directional image. This is accomplished by multiplying the value of each pixel 56 by the corresponding value in each mask 60, 62. The image magnitude is the edge enhanced image. The image direction contains the direction of the edge 18 at each pixel. The x axis 64 extends along the top row 66 of the image with the origin at the pixel in the upper left hand corner. The y axis 68 extends downward along the left hand column 70 of the image. The direction of an edge 18 is defined as the angle 58 between the edge 18 and the x axis 64. The magnitude image is computed by taking the square root of the sum of the squares of the result of applying the two masks 60 and 62 at each pixel 56.

A sample calculation is illustrated below where (i,j) are coordinates by row and column of the center pixel 44, and f(i,j) is the image array.

For mask 60:

$$S_x = \begin{bmatrix} -1 & -2 & -1 \\ 0 & 0 & 0 \\ 1 & 2 & 1 \end{bmatrix}$$

For mask 62:

$$S_y = \begin{bmatrix} 1 & 0 & -1 \\ 2 & 0 & -2 \\ 1 & 0 & -1 \end{bmatrix}$$

$G_x = f(i+1, j-1) + 2f(i+1, j) + f(i+1, j+1) - f(i-1, j-1) - 2f(i-1, j) - f(i-1, j+1)$ $G_y = f(i-1, j-1) + 2f(i, j-1) + f(i+1, j-1) - f(i-1, j+1) - 2f(i, j+1) - f(i+1, j+1)$

The directional image is calculated by taking the inverse tangent of the ratio of the results of applying the two masks.

If f(i, j) is the image array, mag(i, j) is the magnitude of the Sobel operation and a(i, j) is the edge direction at the point (i, j), then:

$mag(i, j) = [G^2_x + G^2_y]^{\frac{1}{2}}$ $a(i, j) = atan(G_y/G_x)$

The direction of an edge 18 has a 180 degree ambiguity. Accordingly, a convention must be established in order to eliminate this ambiguity and establish a fixed direction for each edge. The convention used is that the edge direction is taken in such a way that the darker side is always on the left when facing in the direction of the edge 18.

Relaxation For Edge Reinforcement

The result of applying the Sobel edge operator yields an image in which some edges are defined very well, some edges are poorly defined, and some edges have holes in them. In addition some large responses are obtained where there are no edges. These are errors which occur because of noise in the original image and also because the Sobel operator is not perfect. However, the Relaxation For Edge Reinforcement 23 calculations enhance edges by increasing the gray tone value of the pixels that are really on edges, and decrease the gray tone value of the pixels which are not on edges. Initially the magnitude and the direction of the edge at each pixel are obtained from the Edge Detecting operation. The magnitude at each pixel location is divided by the maximum of the magnitudes over the entire image in order to define the probability of an edge at each pixel. The location of each pixel is designated by the quantity (i,j), where the first term i represents the row dimension and the second term j represents the column dimension. Relaxation For Edge Reinforcement 24 consists of defining a new edge probability and a new edge angle at each (i,j) in terms of the old probabilities at (i,j) and its neighbors (u,v). The neighbors (u,v) used are the first and second nearest neighbors. This definition of neighbors is not a restriction on the basic technique. As explained in Schacter et al. "An Application of Relaxation Methods to Edge Reinforcement", IEEE Transactions on Systems, Man, and Cybernetics, Vol. SMC-7, No. 11, pp. 813–816, November 1977, the number of neighbors (u,v) used in the relaxation calculations is arbitrary. However, if more neighbors are used, the result will be longer computation times.

The calculation of the new edge probability and the new edge angle makes use of compatibility coefficients Ree, Ren, Rne, and Rnn. These coefficients are used to determine the relationship between a pixel at location (i,j) and one of its neighbors at location (u,v). For example, if an edge 18 (i,j), lying at an angle a(i,j) with respect to the x axis 64, exists at (i,j) and an edge 18 (u,v), lying at an angle b(u,v), exists at (u,v) and the locations (i,j) and (u, v) are separated by a straight line distance d of line 69 which lies at an angle g, a quantitative relationship explains how an edge 18 at location (u,v) will affect the edge 18 at location (i, J). In this example the relation is given by the compatibility coefficient Ree. Ree is known as the edge/edge coefficient and depends upon the respective edge angles a(i,j) and b(u,v) at the two points 18(i,j) and 18(u,v), the angle g, and the distance d. If an edge exists at (i,j) and no edge exists at (u,v) the relation is given by the compatibility coefficient Ren. Collinear edges will reinforce one another while edges at different angles will weaken one another. Similarly, edges are weakened by collinear non-edges, and non-edges are strengthened by edges alongside them. The definitions of the compatibility coefficients, the method of computing the edge probability, and the method of computing the new edge angle are the same as those detailed in Schacter et al. noted above.

The probability P(i,j) of an edge at the pixel location (i,j) is given by:

$$P(i, j) = \frac{mag(i, j)}{max} \qquad (1)$$

where max is equal to the maximum value of mag(i,j) taken over the entire image. The probability of no edge at the location (i,j) is $1 - P(i,j)$. The expressions used for each of the compatibility coefficients is discussed below.

Compatibility Coefficients

Figure 5A:
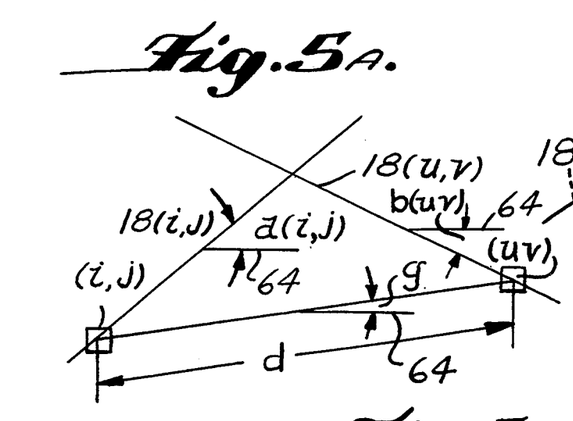
FIG. 5A is an illustration of a pixel of interest (i,j) and a neighboring (u,v) pixel, their edge angles and the line interconnecting them.

Referring to FIG. 5A, the direction of the edge 18(i,j) at the point (i,j) is designated by a(i,j). The direction of the edge 18(u,v) at the point (u,v), its neighbor, is designated by b(u,v). The direction of the line 69 joining (i,j) to (u,v) is designated g. The chessboard distance (d) from (i,j) to (u,v) is given by:

$$d = maximum \ (|i-u|, |j-v|) \qquad (2)$$

The edge/edge compatibility coefficient Ree is given by:

$$Ree = \cos\ [a(i,j) - g]\cos[b(u,v) - g]/(2)^d \qquad (3)$$

It can be seen from equation (3) that when $a(i,j) = g = -b(u,v)$ a maximum value for Ree is obtained. This occurs when the edge direction a(i,j) at pixel (i,j) has the same value as the edge direction b (u,v) at pixel (u,v) and both edge directions are equal to the direction g of the line 69 joining (i,j) to (u,v). The compatibility coefficient given by (3) is not unique and other possibilities could be developed. However, for this example only equation (3) was used for Ree.

The edge probability at the point (i,j) is weakened by a non-edge point which is collinear with it. The following expression is used for the edge no edge compatibility coefficient Ren:

$$Ren = minimum[0, -\cos(2a(i,j) - 2g)/(2)^d] \quad (4)$$

In equation (4) minimum means: take the minimum of the two quantities enclosed in the brackets.

The no edge probability at pixel (i,j) is influenced by the probability of an edge at pixel (u,v) according to the following expression for Rne:

$$Rne = [1 - \cos(2b(u,v) - 2g)]/(2)^{d+1} \quad (5)$$

The no edge probability at pixel (i,j) is strengthened by the no edge probability at pixel (u,v) according to the following equation for Rnn:

$$Rnn = 1/(2)^d \quad (6)$$

Reinforcement Process

The result of considering the total effect of all the first and second nearest neighbors on the edge probability and the no edge probability at pixel (i,j) is given by Q(i,j) and Qn(i,j) respectively:

$$Q(i,j) = \sum_{\substack{u=i-2 \\ (u,v)}}^{i+2} \neq \sum_{\substack{v=j-2 \\ (i,j)}}^{j+2} \{C_1 P(u,v)Ree[(i,j), (u,v)] + \quad (7)$$

$$C_2 [1 - P(u,v)]Ren[(i,j), (u,v)]\}$$

$$Qn(i,j) = \sum_{\substack{u=i-2 \\ (u,v)}}^{i+2} \neq \sum_{\substack{v=j-2 \\ (i,j)}}^{j+2} \{C_3 P(u,v)Rne[(i,j), (u,v)] + \quad (8)$$

$$C_4 [1 - P(u,v)]Rnn[(i,j), (u,v)]\}$$

The quantities $C_1$, $C_2$, $C_3$, and $C_4$ are each chosen to have a value between 0 and 1. Also, the sum of the four quantities is chosen to be always equal to 1. The quantities Qh and Qhb are defined as follows:

$$Qh = \frac{Q}{|Q| + |Qn|} \quad (9)$$

$$Qhb = \frac{Qn}{|Q| + |Qn|} \quad (10)$$

The quantities Pp and Ppb are defined as follows:

$$Pp = P(i,j) [1 + Qh] \quad (11)$$

$$Ppb = [1 - P(i,j)][1 + Qhb] \quad (12)$$

The new probability of an edge at the location (i,j) is designated as Pn(i,j) and is given below:

$$Pn(i,j) = \frac{Pp}{Pp + Ppb} \quad (13)$$

Equation (13) provides an expression for the new edge probabilities in terms of the old probability P(i,j) and in terms of the edge probabilities of the first and second nearest neighbors of (i,j). The direction of the edge at location (i,j) given by a(i,j) is also updated to generate a new angle an(i,J) as follows:

$$Dx(i,j) = W\{P(i,j) \cos[a(i,j)]\} + \quad (14)$$

$$\sum_{\substack{u=i-2 \\ (u,v)}}^{i+2} \neq \sum_{\substack{v=j-2 \\ (i,j)}}^{j+2} P(u,v)Ree[(i,j), (u,v)] \cos[b(u,v)]$$

$$Dy(i,j) = W\{P(i,j) \sin[a(i,j)]\} + \quad (15)$$

$$\sum_{\substack{u=i-2 \\ (u,v)}}^{i+2} \neq \sum_{\substack{v=j-2 \\ (i,j)}}^{j+2} P(u,v)Ree[(i,j), (u,v)] \sin[b(u,v)]$$

$$an(i,j) = a\tan[Dy(i,j)/Dx(i,j)] \quad (16)$$

In the above equations the quantity W is a constant which is determined along with $C_1$, $C_2$, $C_3$, and $C_4$ by an experimental iterative process. W usually assumes values between 2 and 10. When W is large the new edge direction an(i,j) is almost the same as a(i,j). On each iteration through the image a new edge probability and a new edge direction are computed.

THINNING

Figure 5B:
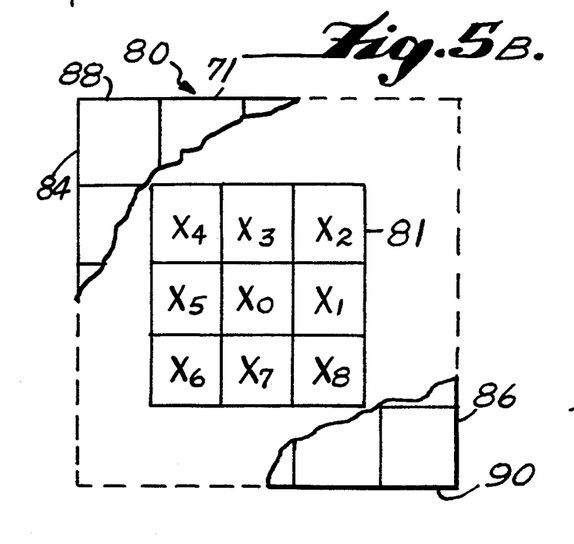
FIG. 5B is an illustration of a pixel and its eight neighbors.

After several iterations of relaxation the image is essentially binary. However, some of the strong edges are now too thick and a Thinning 24 routine is used in order to obtain line like patterns. Referring to FIG. 5B, it is assumed that an image 80 consists of only two gray values represented by 0 and 1. A 3×3 array 81 in the image 80 including center pixel $X_0$ and its 8 neighbors $X_1$-$X_8$ is illustrated. A frame 82 around the image 80 consisting of a first row 84, a first column 88, a last row 86, and a last column 90 is assumed to contain only 0-pixels. If the center pixel $X_0$ has the value of 1 then a 1 in any of the 8 neighboring positions $X_1$-$X_8$ is considered connected to the center pixel $X_0$. This is known as 8-connectivity. It is assumed that 8-connectivity exists for 1-pixels and 4-connectivity exists for 0-pixels. The four pixels involved in 4-connectivity are $x_1$, $x_3$, $x_5$, and $x_7$. The objective of Thinning 26 is to determine if a 1 at pixel position $x_0$ can be changed to a 0. This must be done without destroying the connectivity of any given component of 1-pixels (i.e. without producing a gap in the edge). The particular thinning routine employed makes use of a parameter called the 8-connectivity number. This parameter is given the symbol $N(x_0)$ and is defined by the following expression:

$$N(x_0) = \sum_{k \in S_1} (x_k - x_k x_{k+1} x_{k+2}) \quad (17)$$

In equation (17) the set $S_1$ consists of the following odd integers {1, 3, 5, 7}. $\bar{x}_k$ means $1 - x_k$ and the value of a subscript larger than 8 is equal to k−8. Equation (17) was developed by Yokoi et al. "An Analysis of Topological Properties of Digitized Binary Pictures Using Local Features", Computer Graphics Image Processing, No. 4, pp. 63–73, 1975 in order to analyze the topological properties of a binary image. The following steps are used to perform the thinning operation:

(1) Start a scan of the entire image beginning with the upper left hand pixel.

(2) If a 0 is encountered continue the scan of the image.

(3) If a 1 is encountered compute the 8-connectivity number.

(4) If the 8-connectivity number is equal to 1 and the number of 1-pixels in the 8-neighborhood of $x_0$ is greater than 1 and $x_3 = 0$ then mark pixel $x_0$ to be changed from a 1 to a 0.

(5) Complete the scan of the entire image.

(6) Change all the pixels from 1's to 0's that have been marked for change.

(7) Go to step 1 and repeat steps 1 through 6 except that in step 4 change the criterion $x_3 = 0$ to $x_7 = 0$.

(8) Go to step 1 and repeat steps 1 through 6 except that in step 4 change the criterion $x_3 = 0$ to $x_7 = 0$.

(9) Go to step 1 and repeat steps 1 through 6 except that in step 4 change the criterion $x_3 = 0$ to $x_1 = 0$.

(10) Repeat steps 1 through 9 until all possible deletable 1-pixels are changed from 1 to 0.

The result of the thinning process is an image with thin defined edges.

CONNECTED COMPONENTS

Figure 5C:
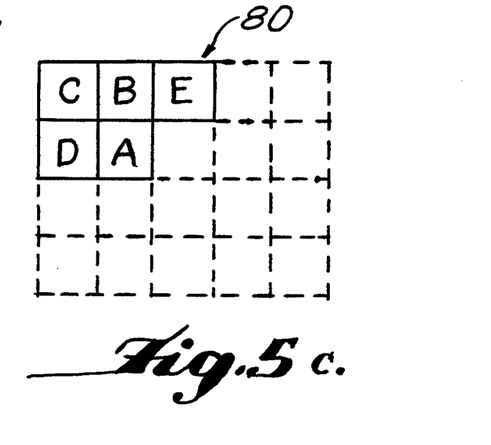
FIG. 5C is an illustration of connected component labeling.

The purpose of Connected Components 25 is to provide a unique label for each component of 1-pixels in the binary image which has been thinned. Each label is a number of which is assigned to every pixel in a given connected component. This labeling operation can be performed by scanning the entire binary image 80 with a 3×3 array and considering the pattern shown in FIG. 5C:

```
C B E
D A
```

If a scan is taken along the image from left to right and from top to bottom, then if the pixel A is the pixel presently being considered and it has a value of 1 then a label must be assigned to A. The pixels D, C, B, and E have already been labeled and can be used to label A. If the pixels at D, C, B, and E are all 0 then A is given a new label. If pixels C, B, and E are all 0 and D=1 then A is given the label of D. Each possible construction of 0's and 1's for the pixels D, C, B, and E must be considered when providing a label for A. If two or more pixels in the set D, C, B, and E are equal to 1 and they all have the same label then A is also given the same label. A difficulty occurs when two or more separate components which were originally assigned different labels are found to be connected at or near pixel A. For these cases the pixel A is given the label of any one of the pixels D, C, B, or E which has a value equal to 1. An equivalence list consisting of pairs of equivalent labels is formed. After the binary image has been completely scanned, the equivalence list is restructured in such a way as to contain a number of lists. Each of these lists contains all of the equivalent labels associated with a particular connected component. A new label is then given to each of the new lists and is assigned to each of the appropriate pixels. In this way each grouping of connected pixels is identified as a connected component and appropriately labeled.

REGION PROPERTY CALCULATIONS

The purpose of Region Property Calculations 26 is to determine if the computation of certain quantities can be used to isolate the particular connected components which belong only to the airfield runway pattern. Computations are performed on each connected component. Eleven exemplary region properties may be selectively used in the invention as follows. The definitions of each of the above properties is discussed below.

1. Area
2. Centroid
3. Orientation of the axis of least inertia
4. Maximum moment of inertia
5. Minimum moment of inertia
6. Elongation
7. Measure of region spread
8. Scatter Matrix
9. Eigenvalues of the scatter matrix
10. Perimeter
11. Compactness Let the quantity $P_{ij}$ take on the value 1 when (i,j) is located in a connected component of interest and have the value of 0 otherwise. (The value $P_{ij}$ is not equal to the label of the connected component derived previously. The label of a connected component is used only to isolate that component for this analysis.)

The area of a connected component which has a particular label is given the symbol A and can be determined from the following equation:

$$A = \sum_{i=0}^{m-1} \sum_{j=0}^{n-1} P_{ij} \qquad (18)$$

where m is the number of rows and n is the number of columns in the binary image.

The centroid or center of area is considered located at the coordinates $(i_0, j_0)$ and may be expressed in terms of the previously found area as:

$$i_0 = \frac{1}{A} \sum_{i=0}^{m-1} \sum_{j=0}^{n-1} P_{ij} \qquad (19)$$

$$j_0 = \frac{1}{A} \sum_{i=0}^{m-1} \sum_{j=0}^{n-1} P_{ij} \qquad (20)$$

The orientation of the axis of least inertia is defined as the angle between a vertical line pointing downward and the axis of least inertia for the connected component being considered. The symbol $\theta$ will be used for this orientation and can be expressed by the following expression:

$$\theta = \frac{1}{2} \tan^{-1} [2b/(a - c)] \qquad (21)$$

where:

$$a = \sum_{i=0}^{m-1} \sum_{j=0}^{n-1} i^2 P_{ij} - i_0^2 A \qquad (21a)$$

$$b = \sum_{i=0}^{m-1} \sum_{j=0}^{n-1} ij P_{ij} - i_0 j_0 A \qquad (21b)$$

$$c = \sum_{i=0}^{m-1} \sum_{j=0}^{n-1} j^2 P_{ij} - j_0^2 A \qquad (21c)$$

The moment of inertia of a region or connected component about a line is the sum of the squares of the distances from each pixel in that region to the line. Using this basic definition, expressions for the maximum $I_{max}$ and minimum $I_{min}$ moments of inertial can be found. Expressions for the two quantities $I_{max}$ and $I_{min}$ are given below:

$$I_{max} = \frac{a+c}{2} + \sqrt{\frac{4b^2 + (a-c)^2}{2}} \tag{22}$$

$$I_{min} = \frac{a+c}{2} - \sqrt{\frac{4b^2 + (a-c)^2}{2}} \tag{23}$$

A measure of elongation (E) can be obtained in terms of the maximum and minimum moments of inertia as follows:

$$E = \frac{I_{max} - I_{min}}{I_{max} + I_{max}} \tag{24}$$

Equation (24) provides a measure of how elongated a region is. The more elongated a region is in one particular direction the greater the value of E.

A measure of the spread (s) of a region can also be obtained by using the maximum and minimum moments of inertia and the area:

$$s = \frac{I_{max} + I_{min}}{A_r^2} \tag{25}$$

The scatter matrix (S) is a symmetric 2 by 2 matrix:

$$S = \begin{vmatrix} \sum_{i=0}^{m-1} \sum_{j=0}^{n-1} i^2 p_{ij} & \sum_{i=0}^{m-1} \sum_{j=0}^{n-1} ij p_{ij} \\ \sum_{i=0}^{m-1} \sum_{j=0}^{n-1} ij p_{ij} & \sum_{i=0}^{m-1} \sum_{j=0}^{n-1} j^2 p_{ij} \end{vmatrix} \tag{26}$$

Two eigenvalues $\lambda_1$ and $\lambda_2$ of S are both real and can be computed from (26). The solutions for the two eigenvalues ($\lambda_1$ and $\lambda_2$) are given below:

$$\lambda_1 = \frac{(d+g)}{2} + \sqrt{\frac{(d+g)^2 + 4(f^2 - dg)}{2}} \tag{27}$$

$$\lambda_2 = \frac{(d+g)}{2} - \sqrt{\frac{(d+g)^2 + 4(f^2 - dg)}{2}} \tag{28}$$

where d, f, and g are defined below:

$$d = \sum_{i=0}^{m-1} \sum_{j=0}^{n-1} i^2 p_{ij} \tag{28d}$$

$$f = \sum_{i=0}^{m-1} \sum_{j=0}^{n-1} ij p_{ij} \tag{28f}$$

$$g = \sum_{i=0}^{m-1} \sum_{j=0}^{n-1} j^2 p_{ij} \tag{28g}$$

The eigenvalues in (27) and (28) are measurements of the length and width, respectively of the region under consideration.

The perimeter of a region is defined as the number of places that a 0 is adjacent to a 1. Adjacent is taken to mean that a 1 in the position of $x_0$ in FIG. 5B must have a 0 in position $x_1$, $x_3$, $x_5$, or $x_7$ in order to be counted as part of the perimeter. The symbol P to be used for the perimeter. The last region property to be considered is compactness and may be defined in terms of the perimeter and the area as follows:

$$C_p = \frac{P^2}{A} \tag{29}$$

Extract Connected Components

In order to determine which of the connected components belong to an airfield, selected region property calculations are applied to the various features in Extract Connected Components 27. If, for example, a feature or connected component has a large area A and has a large spread s which is of a selected value, the connected component is considered to be an airport feature and is extracted or retained in the image. Otherwise, it is excluded.

It has been found as hereinafter discussed that area A and region spread s were the most effective criteria for determining components of interest.

BORDER FOLLOWING

Border Following 28 determines and uniquely labels all 1-pixels which exist between a given connected component of 1-pixels and a connected component of 0-pixels. A border point is defined as a 1-pixel which has at least one 0-pixel in its 4-neighborhood. The 4-neighborhood of a pixel consists of the pixels $x_1$, $x_3$, $x_5$, or $x_7$ as shown in FIG. 5B. A border point can also be described as a 1-pixel located on the boundary between a connected component of 1-pixels and a connected component of 0-pixels, see FIGS. 6A and 6B. The binary image 80 (FIG. 5B) has frame 82 consisting of the first row 84, the last row 86, the first column 88, and the last column 90. It is assumed that all the pixels on the frame 82 have a gray value of 0. Given a connected component $S_1$ of 1-pixels and a connected component $S_2$ of 0-pixels, if there exists at least one pixel belonging to the component $S_2$ on every possible 4-connected path (e.g. $X_1$, $X_3$, $X_5$ and $X_7$ in FIG. 5B) from a pixel in $S_1$ to a pixel on the frame 82 then the component $S_2$ is said to surround $S_1$. If $S_2$ surrounds $S_1$ and there exists at least one border point 92 between them, then $S_2$ is said to surround $S_1$ directly.

Figure 6A:
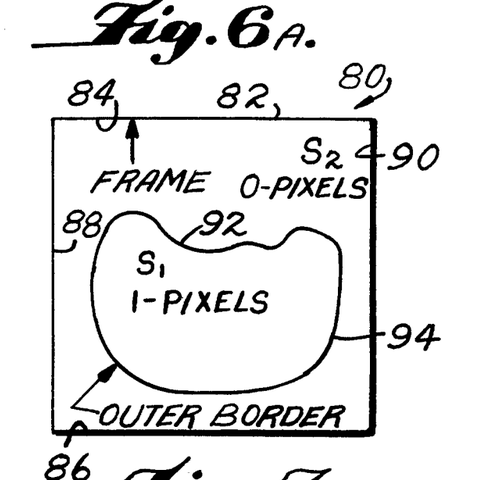
FIGS. 6A and 6B illustrate various border conditions.
Figure 6B:
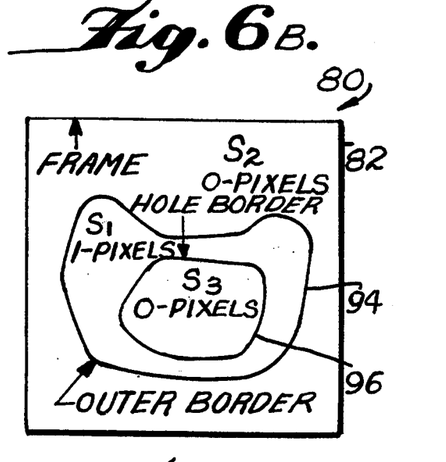

There are two types of borders which can exist in binary images of interest, outer borders 94 and hole borders 96, as shown in respective images 80B and 80C of FIGS. 6A and 6B. FIG. 6a has an image 80B with an outer border 94 defined as the set of 1-pixels located between a connected component $S_1$ of 1-pixels and a connected component $S_2$ of 0-pixels which surrounds it directly. FIG. 6b has an image 80C with a hole border 96 defined as the set of 1-pixels which exist between a connected component $S_3$ of 0-pixels and a connected component $S_1$ of 1-pixels which surrounds it directly. For outer borders 94 and hole borders 96, the border itself is defined by a set of 1-pixels. 0-pixels are not used to define a border, except in the case of the frame 82 which is considered a special hole border. For any given connected component of 1-pixels (e.g. $S_1$) there is one and only one outer border 94 and it is unique. For a given hole $S_3$ located within a connected component $S_1$ of 1-pixels the hole border 96 is also unique. If a connected component $S_2$ of 0-pixels contains the frame 82 of the image, then $S_2$ is called the background of the image 80, otherwise $S_2$ is a hole.

A parent border of an outer border 94 located between a connected component $S_1$ of 1-pixels and a connected component $S_2$ of 0-pixels is defined as either:

(1) the hole border between $S_2$ and the connected component of 1-pixels which surrounds $S_2$ directly, if $S_2$ is a hole; or (2) the frame 82 of the image 80B (FIG. 6a) if $S_2$ is the background.

In the image 80C (FIG. 6b) the parent border of hole border 96 between a connected component $S_3$ of 0-pixels and a connected component $S_1$ of 1-pixels which surrounds $S_3$ directly is defined as the outer border 94 between $S_1$ and the connected component $S_2$ of 0-pixels which surrounds it directly.

Figure 7:
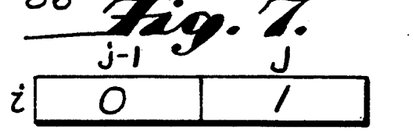
FIG. 7 and 8 illustrate respective starting conditions for an outer border and a hole border.
Figure 8:
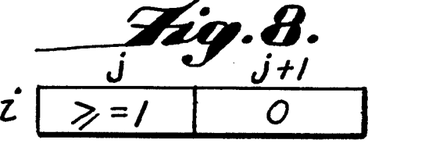

There are two algorithms that are implemented in the invention for border following. The theory behind both of these algorithms is set forth in Suzuki et al. "Topological Structural Analysis of Digitized Binary Images by Borde Following", Computer Vision, Graphics and Image Processing, No. 30, pp. 32–46, 1985. The basic ideas involved in each of these algorithms is discussed briefly herein. An algorithm which finds all of the borders is initiated by scanning the binary image row by row beginning in the upper left hand corner and interrupting the scan only when a pixel at the coordinates (i,j) is found which satisfies the condition for the starting point of an outer border or a hole border. The conditions are illustrated in FIG. 7 and FIG. 8 and are also set forth below:

Condition I

Condition II

In the above conditions the 0's and 1's are pixel values not coordinate (i,j) values.

If a pixel 100 at location (i,j) satisfies both of the above conditions, then (i,j) must be regarded as the starting point of an outer border. A unique number is assigned to each newly found border. This number is called the sequential number of the border and is given the designation NBD.

The parent border of a newly found border is also determined as follows. While scanning the image, the number of the border (NBD) encountered just prior to finding the newly found border is given the designation LNBD. This previous border is either the parent of the newly found border or a border which shares a common parent with the newly found border. If border C is the newly found border (NBD) and border B is the most previously found border (LNBD), then the parent border of C is determined by using the table below. As an example if C is an outer border and B is an outer border, then the parent border of C is equal to the parent border of B. If C is a hole border and B is an outer border, then the parent border of C is equal to B. The parent border of a newly found border may, if desired, be used to determine various topological properties of a binary image. However, these topological properties of the binary image are not detailed herein.

| Type of border for C | Type of border for B | |
|---|---|---|
| | Outer Border | Hole Border |
| Outer Border | The parent border of B | The border B |
| Hole Border | The border B | The parent border |

| Type of border for C | Type of border for B | |
|---|---|---|
| | Outer Border | Hole Border |
| | of B | |

Figures 9A, 9B, 10:
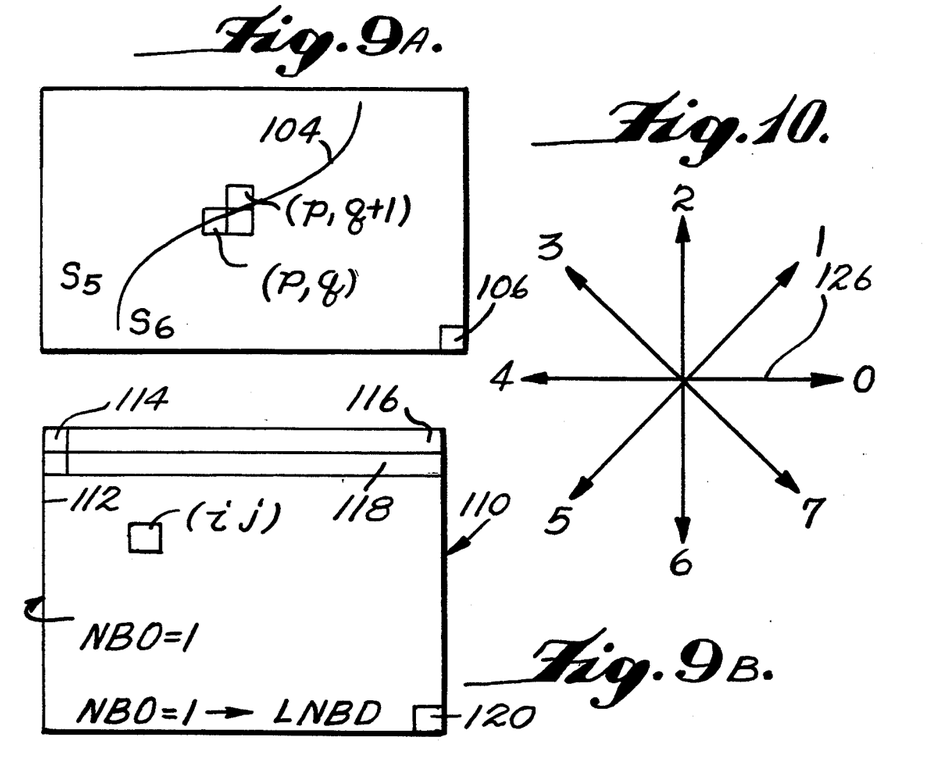
FIG. 9A is a general illustration of Border Following according to the present invention.
FIG. 9B is a more detailed illustration of Border Following according to the present invention.
FIG. 10 illustrates the principle of Freeman code generation.

The newly found border is followed by using the following marking scheme. The symbols (p,q) in FIG. 9A are used to designate the row and column locations of an arbitrary point on a border 104 being followed. If border 104 that is being followed is between a connected component $S_6$ of 0-pixels which includes the pixel at (p,q+1) and a connected component $S_5$ of 1-pixels which includes the pixel at (p,q), then the value of the pixel (p,q) is changed to $-NBD$. Otherwise the value of the pixel location (p,q) is set equal to NBD unless it is on a border that has already been followed. These conditions prevent the pixel (p,q) from being the starting point of an already followed hole border or outer border. After following and marking the entire border the scan is resumed. When the scan reaches the pixel 106 in the lower right hand corner of the image, the process is completed.

Eliminate Pixels Not on the Outermost Borders

In Eliminate Pixels Not On the Outermost Borders 29, the border following algorithm can be modified so that only the outermost borders of a binary image are followed. An outermost border is an outer border between a connected component of 1-pixels and the background. Border following is initiated only at the pixels which satisfy the condition for the starting point of an outer border (FIG. 7) and the parameter LNBD is less than or equal to 0. Marking is the same as that given by the previous algorithm except that the values 2 and $-2$ are substituted for the values NBD and $-NBD$, respectively.

Let an input binary image 110 in FIG. 9b be designated by the symbol f(i,j). The value of f(i,j) will be either 1 or 0 at the location (i,J). A unique number designated NBD is assigned to each newly found border. Initially NBD is set equal to 1 to correspond with the frame 112 of the image. (The frame 112 of the image forms a special hole border and receives the sequential number (NBD) equal to 1.) The input binary image 110 is scanned in a raster fashion beginning with the pixel 114 in the first row 116 in the upper left hand corner. The number of the border (NBD) encountered just prior to finding a new border is designated by the quantity LNBD. Each time the scan starts a new row 118 in the image, the value of LNBD is reset to 1. The following steps are carried out for each pixel which has a value of f(i,j) unequal to 0:

Step 1: Select one of the following:
a. If f(i,j)=1 and f(i,j−1)=0 then make the decision that the pixel (i,j) is the starting point of an outer border, the quantity NBD is incremented by 1 and set $i_2=i$ and $j_2=j-1$. The following convention is used to designate the border type:
outer border→type=1
hole border→type=0
b. Else, if f(i,j)>1 or f(i,j)=1 and f(i,j+1)=0, then make the decision that the pixel (i,j) is the starting point of a hole border. The quantity NBD is incremented by 1. Also, set $i_2=i$ and $j_2=j+1$ and set LNBD=f(i,j) when f(i,j)>1.
c. Otherwise, go to step 4.

Step 2: Depending on the types of the newly found border and the border with the sequential number LNBD (the last border met on the current row) determine the parent border of the newly found border by using the method illustrated in FIG. 9A.

Step 3: Starting with the point (i,j) follow the newly detected border. This is accomplished by the using the following Steps 3.1 to 3.5:

Step 3.1: Starting with the pixel at the location ($i_2$, $j_2$) move around the pixel (i,j) in a clockwise direction and look for the first pixel which has a value unequal to 0. Let the coordinates of the first nonzero pixel found be ($i_1$, $j_1$). If no nonzero pixel is found, then set f(i,j)=−NBD and go to step 4.

Step 3.2: Set $i_2=i_1$, $j_2=j_1$, $i_3=i$, and $j_3=j$.

Step 3.3: Starting with the pixel located next to the pixel at ($i_2$, $j_2$) in a counterclockwise direction, examine each pixel in the neighborhood of the pixel ($i_3$, $j_3$) to find a nonzero pixel and let the coordinates of the first one be ($i_4$, $j_4$).

Step 3.4: The value of the pixel at location ($i_3$, $j_3$) is changed according to the following rule:

(a) If the pixel at ($i_3$, $j_3+1$) is a 0 pixel examined in step 3.3 then set the pixel at location ($i_3$, $j_3$) equal to −NBD.

(b) If the pixel at location ($i_3$, $j_3+1$) is not a 0 pixel examined in step 3.3 and the value of f($i_3$, $j_3$)=1, then change f($i_3$, $j_3$) to be equal to NBD.

(c) Otherwise do not change the value of the pixel at the location ($i_3$, $j_3$).

Step 3.5: If $i_4=i, j_4=j, i_3=i_1$ and $j_3=j_1$ which means coming back to the original starting point) then go to step 4; otherwise set $i_2=i_3$, $j_2=j_3$, $i_3=i_4$, $j_3=j_4$ and go back to step 3.3.

Step 4: If f(i,j) is not equal to 1 then put |f(i,j)|→LNBD and resume the raster scan at the pixel located at (i,j+1). The algorithm terminates when the scan reaches the pixel 120 in the lower right hand corner of the image 110.

Generate Freeman Chain Codes

Once all the border pixels have been found, the binary image is converted into a format which can be used for the formation of line segments. Freeman Chain Codes 38 are used to represent a boundary with a sequence of numbers each of which indicates the change in direction from one border pixel to the next. The 8-direction chain is shown in FIG. 10. Each number corresponds to a particular change in direction from one pixel to the next [e.g. (i,j)→(i−1, j+1)] which exists in the border. The number 0 represents a change in direction of 0 degrees from pixel (i,j) to pixel (i−1, j+1). The angular change is measured from the horizontal to the border formed by joining the current pixel to the next pixel. The number 4 represents a change of 180 degrees from one pixel to the next, etc. One entire chain code is represented by a list whose first two elements are the (i,j) coordinates of the initial point 122 (FIG. 9B) in the chain, followed by a sequence of numbers each of which comes from the set {0, 1, 2, 3, 4, 5, 6, 7 }. Each of these numbers represents the change in direction from one pixel to the next. The entire binary image will consist of many such chains. In order to form the chain codes, a tracking routine examines the nearest neighbors of a pixel in the border in order to find the next pixel in the border. An index array or table is initially set to contain all zeroes. The input binary image is scanned by starting with the pixel in the upper left hand corner of the image. When a 1 is found at the location (i,j) and the contents of the index array at (i,j) is 0, a new chain is started. As each pixel in the chain is found the appropriate number from the set {0, 1, 2, 3, 4, 5, 6, 7} is placed into the chain list and a 1 is placed into the corresponding location of the index array. When the scan reaches the pixel 120 in the lower right hand corner, the algorithm terminates.

POLYGON APPROXIMATION

Figures 11, 12:
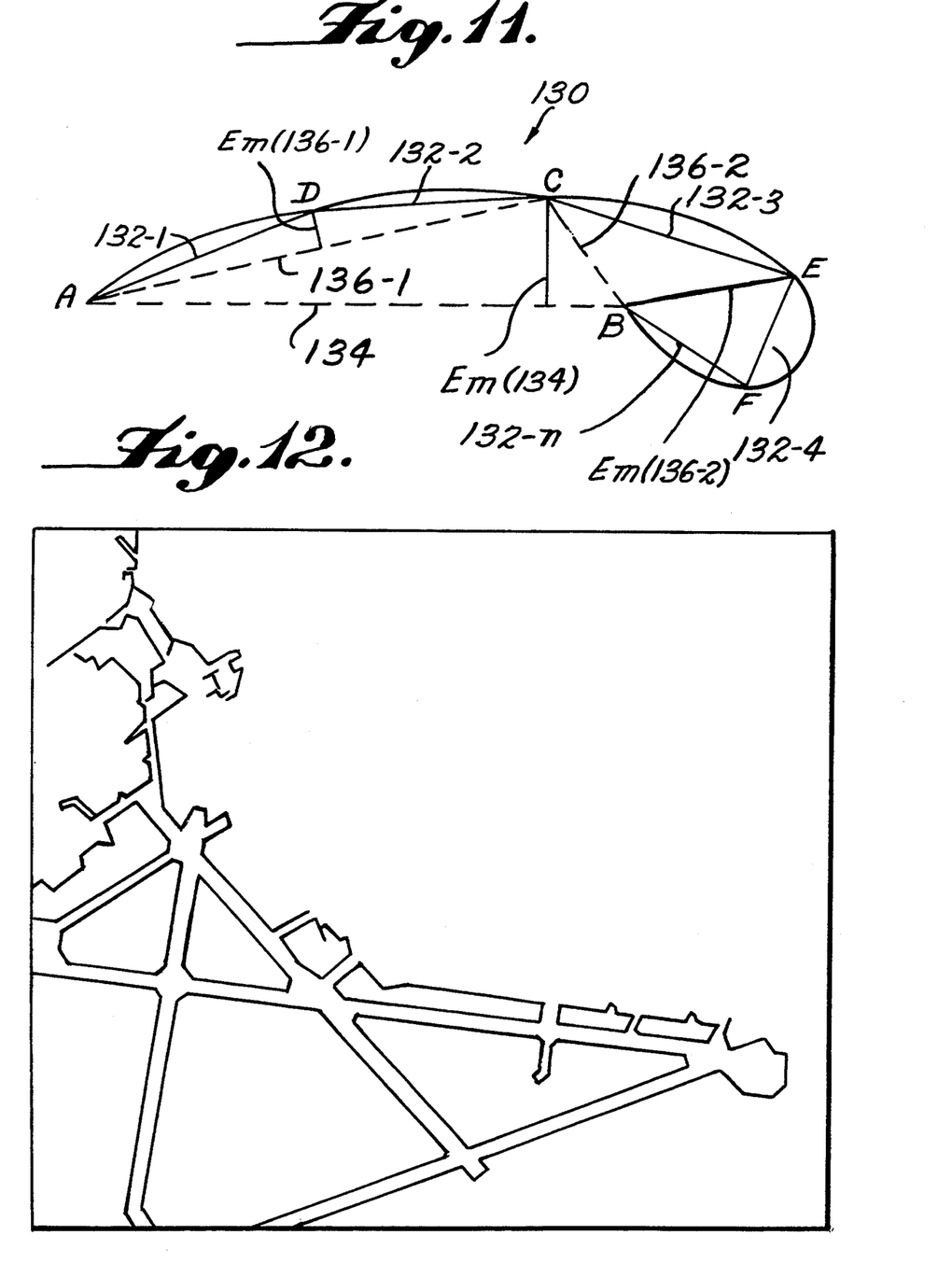
FIG. 11 is an illustrative example of Polygon Approximation with an open curve.
FIG. 12 is a line drawing representing the results of airport feature extraction achieved by the present invention.

An arbitrary two dimensional open or closed digital curve is represented by a Freeman chain code and consists of an ordered set $C_s$ of N pixels. The purpose of Polygon Approximation 40 is to replace each digital curve (e.g. curve 130, FIG. 11) with a consecutive series of line segments 132-1 . . . 132-n, each of which are within a certain error $E_r$ which is a measure of the greatest perpendicular distance PE from the line segment 132-1 . . . 132-n to the original curve 130. There are many polygon approximation techniques, and the theory behind the one used in the invention is set forth in Ramer "An Iterative Procedure for the Polygonal Approximation Plane Curves", Computer Graphics and Image Processing, No. 1, pp. 244–256, 1972. The pixels in the set $C_s$ can be considered as the vertices $P_i$ of a polygon if the curve is closed (not shown). If the curve 130 is not closed, as shown in FIG. 11, the set $C_s$ can be considered as the vertices of a consecutive series of line segments. In either case the task of the polygon approximation algorithm is to provide a reduced set $C'_s$ with a smaller number of edges N' and whose vertices $P'_k$ coincide with those of the original set $C_s$.

The basic concept is illustrated in FIG. 11. The solid curve 130 between points A and B represents a digital curve to be approximated by a consecutive series of line segments 132-1 . . . 132-n. The first approximation is the dashed line 134 between points A and B. If the error measure $E_m$ (134) from line 134 to the curve 130 is less than or equal to an allowable error $E_r$ the line 134 approximates the given curve 130, and the algorithm terminates. If, however, the error $E_r$ is unacceptable, i.e. $E_m > E_r$ then the curve 130 is divided at point C into two line segments 136-1, 136-2. The point C is the point of the greatest $E_m$ (134) between dashed line 134 and the curve 130 between points A and B. If the two line segments 136-1, 136-2 approximate the curve 130 within the limits, i.e. $E_m(136-1)$ and $E_m(136-2) \leq E_r$, then the algorithm terminates. If not, the curve 130 is broken at D and E. This process continues until all points on the curve 130 are within the acceptable error $E_r$ of the approximating line segments. The final result for the curve in FIG. 11 is the series of line segments 132-1 . . . 132-n. This algorithm is applied to each chain in the binary image.

EXAMPLE

In the following example, the objective was to see if the components of an airfield could be isolated for the sample image used. The image taken from an unclassified Report entitled "Automated Extraction of Airport Runway Patterns From Radar Imaging", Hevenor et al., U.S. Army Engineer Topographic Laboratories ETL0567, 1990 was a 512 by 512 pixel image which contained an airfield located near Elizabeth City, N.C. The radar system used to obtain the image was the UPD-4 system which is an X-band radar with HHpolarization. The radar image was digitized with 8-bits. The image processing algorithms were written in the LISP programming language and executed on a Symbolics 3670 LISP machine. The same algorithms were later recoded in the C programming language and implemented on a SUN 3/180 microcomputer system for ease of transfer to a development laboratory.

The results of applying the above algorithms to the radar image is presented in the Report noted above as a series of photographic images at each relevant stage of image processing according to the invention. The original radar image is in pseudo-color. Each gray value is associated with a unique color for this presentation. The pseudo-colors were chosen in such a way that black is associated with a gray value of 0. Two applications of Edge Preserving Smoothing 21 were performed. Although there appears to be little difference between the results before and after Edge Preserving Smoothing, it was found that eliminating this step produced much poorer results further on. Thereafter, the Sobel Operator in Edge Detecting 22 was applied to the smoothed image. Another array was used to hold the edge direction information. Although most edges were enhanced, some noise was present and the results were not uniform along any one edge. Also, there were many responses where there are no real edges. The edge direction information was computed and placed in a separate array but cannot be displayed as an image. Nine iterations of Relaxation For Edge Reinforcement 23 were performed. (These nine iterations took 3.5 to 4 hours of computer time on the Symbolics 3670 which was available at the time these results were obtained. More advanced computers now available would reduce the computation time to a few minutes). Computations were performed for several different values of the coefficients $C_1$, $C_2$, $C_3$, $C_4$ and W. It was found that making the value $C_1$ larger resulted in thicker edges while if the value of $C_4$ became too small, gaps or holes would appear at various places. The final values which were utilized to obtain the image in FIG. 15 are given below: $C_1=0.76$ $C_2=0.23$ $C_3=0.005$ $C_4=0.005$ $W=8.0$ The image obtained from the relaxation calculations is almost binary and was used as an input to Thinning 24. As a result of Thinning 12 most edges were reduced to only one pixel width. After Thinning 12 the result of applying image data through the Connected Components 25 algorithm resulted in the assignment of over 100 separate components. After applying the Connected Components image data through Region Property Calculations 26, a set of data for the connected components was derived. This data was next applied to Extract Connected Components 27 from which airfield patterns were extracted. The other components were discarded. This was accomplished in the example by using the region properties of area, the orientation of the axis of least inertia, and the measure of region spread. It was discovered that the orientation of the axis of least inertia was not required to extract the connected components belonging only to the airfield. After extracting airport components, borders were identified in Border Following 28 and data was then applied to Eliminate Pixels Not On Outermost Borders 29. The resulting outermost border data was applied to Generate Freeman Codes 30 which produces the Freeman chain codes. FIG. 12 shows the application of the data after Polygon Approximation 31 was performed. A maximum error $E_r$ of 2 pixels was used to arrive at this image. The runway pattern of the airfield has clearly been extracted. The image data may be stored in a database for later use in targeting purposes. Additional photographs showing the results of intermediate processing steps may be found in the Report noted above.

While there have been described what at present are considered to be preferred embodiments of the invention, it will be readily apparent to those skilled in the science that various changes and modifications may be made therein without departing from the invention. Accordingly, it is intended in the claims which follow to cover all such changes and modifications which fall within the true spirit and scope of the invention.

What is claimed is:

1. A method for extracting terrain features of an image formed by an array of pixels comprising the steps of:

smoothing the image at each pixel in a direction which is most homogeneous for each pixel for preserving edges in the image;

detecting the magnitude and direction of edges at each pixel;

enhancing the edges by increasing gray tone values of pixels on edges and decreasing gray tone values of pixels not on edges in accordance with the occurrence of edges and non-edges in a selected neighborhood of each pixel and an angle associated with each edge and non-edge;

thinning edges to obtain at least a single pixel line without destroying connectivity of the edges;

labeling connected components formed from connected pixels by using a selected value;

calculating properties of each connected component in terms of at least area and region spread for identifying connected components;

identifying borders between connected components;

eliminating pixels not on the identified borders; and approximating each border as a series of interconnected straight line segments which differ from the border by less than a selected amount.

2. The method of claim 1 further comprising the step of generating a series of coded values for each border indicative of a directional relationship of each pixel in the border with respect to an immediately adjacent pixel in the border.

3. The method of claim 1 further comprising the step of generating an image representing terrain features formed by the straight line segments.

4. The method of claim 1 wherein the smoothing step comprises the steps of averaging the value of pixels in selected areas in the neighborhood about a pixel of interest; determining a variance from the average; and selecting the value associated with the smallest variance.

5. The method of claim 4 wherein the neighborhood is a 5×5 array of pixels about the pixel of interest.

6. The method of claim 4 wherein the selected areas comprise a number of geometric figures having one vertex at the pixel of interest and at least one vertex at a boundary of the neighborhood.

7. The method of claim 6 wherein the geometric figures comprise hexagons and pentagons.

8. The method of claim 4 wherein the selected areas include a square centered on the pixel of interest and lying entirely within the neighborhood.

9. The method of claim 1 wherein detecting the edges comprises the step of applying first and second masks centered at each pixel, the first mask being an orthogonal version of the second mask.

10. The method of claim 9 wherein each mask is a 3×3 array of values for registration with a corresponding 3×3 array of pixels centered at the pixel of interest and applying the mask comprises multiplying each value in the array by the value of the pixel and registration therewith for forming a product and summing the product to produce a value for each mask and taking the square root of the sum of the squares of the values for producing a magnitude value for the edge.

11. The method of claim 10 further comprising the step of taking the inverse tangent of the ratio of the products to produce the angle of the edge.

12. The method of claim 1 wherein enhancing the edges comprises the steps of calculating the angle of an edge at each pixel and the angle of an edge at each one of the selected number of neighboring pixels; and calculating the distance between the pixel and each selected neighbor and the angle between the pixel and its selected neighbors.

13. The method of claim 12 wherein enhancing the edges comprises the steps of calculating compatibility coefficients for each pixel in the image relative to the selected neighboring pixels wherein the compatibility coefficients include:

$R_{ee}$ representing a pixel and its neighbor both on an edge, $R_{en}$ representing a pixel being on an edge and its neighbor not being on an edge, $R_{ne}$ representing a pixel not being on an edge and its neighbor being on an edge, and $R_{nn}$ representing a pixel and its neighbor both not being on an edge and calculating the probability of an edge at each pixel as a ratio of the magnitude of each pixel divided by the maximum value of magnitude over the entire image.

14. The method of claim 13 further comprising the step of determining the probability of an edge at each pixel as a function of $R_{ee}$, $R_{ne}$, $R_{en}$ and $R_{nn}$.

15. The method of claim 1 wherein thinning the edges comprises the steps of defining an eight connectivity number in terms of neighbors surrounding a pixel of interest in which an eight connectivity number of at least one indicates that the pixel of interest is connected to another pixel having a selected value; and eliminating the pixel if any adjacent nondiagonal pixel is the selected value.

16. The method of claim 15 further comprising the step of iteratively repeating the thinning step until all possible eliminations are achieved.

17. The method of claim 1 wherein identifying borders between connected components comprises the steps of scanning the image and relating pixels by value to any adjacent pixel with the same value and labeling the related pixels with an identifying label.

18. The method of claim 17 further comprising the step of equating connected components which are connected to each other but which have different labels in an equivalence table.

19. The method of claim 1 wherein calculating the properties of the connected components comprises the step of calculating the area of each connected component by adding the number of pixels in said component to form a sum.

20. The method of claim 1 wherein calculating the properties of each connected component comprises the step of calculating spread by determining a maximum and minimum moment of inertia of each connected component relative to a centroid of the area.

21. The method of claim 20 wherein calculating the spread comprises the step of determining the sum of the maximum and minimum moment of inertia of each connected component divided by the area of the connected component.

22. The method of claim 20 wherein identifying borders comprises the steps of defining outer borders, hole borders, frame and background, wherein an outer border is a set of first pixels having a first selected value located between the connected component of said selected value and a set of second pixels having a second selected value different than the first value which surrounds said first pixels, a hole border is a set of first pixels which exist between a connected component of second pixels which is surrounded by a set of first pixels, the frame is an outer margin of the image, and the background is connected component of second pixels adjacent the free.

23. The method of claim 22 further comprising the steps of defining parent borders of outer borders and hole borders wherein a parent border of an outer border is one of the hole border between second pixels and first pixels surrounding the second pixels and the frame of the second pixels are the background; the parent border of a hole border is between a connected component of third pixels having the second value in a connected component of first pixels which surrounds the third pixels; and eliminating pixels not on outermost borders.

24. The method of claim 22 further comprising establishing a starting condition for an outer border as:

i=1, J=1;
j−1=0, J=1 and determining a starting condition for a hole border as:

i≧1, j≧1;
i≧1 j+1=0.

25. The method of claim 24 further comprising the steps of assigning a sequential number to each newly formed border and assigning a number related to the sequential number to a border encountered just prior to finding the newly found border.

26. The method of claim 2 wherein generating a series of coded values comprises the step of generating a Freeman chain code for each pixel in the border of an edge.

27. The method of claim 1 wherein approximating each border comprises the steps of connecting selected pixels on a portion of a border with a straight line and evaluating a distance from the line to a point on the border and dividing the portion of the border into line segments connected at the point if the distance is less than the selected amount and dividing the portions of the border until every distance is less than the selected amount.

28. The method of claim 13 wherein:

(i,j) is the pixel of interest, (u,v) is the neighboring pixel, a(i,j) is the angle of the edge at the pixel of interest, b(u,v) is the angle of the edge at the neighboring pixel, d is the distance between the pixels, (i,j) and (u,v) are the lines connecting the pixels, g is the angle of the line connecting the pixels, $R_{ee} = \cos[A(i,j)-G]\cos[B(u,v)-G]/2d$, $R_{en} = \text{minimum}[0, -\cos(2a(i,j)-2g]/(2)^d/2d$ $R_{ne} = [1-\cos(2b(u,v)-2g]/(2)^{d+1}$, $R_{nn} = 1/2^d$.

* * * * *